July 1, 1969      F. P. AUGER      3,452,595

FLOW RATE MEASURING DEVICE

Filed Jan. 24, 1967

FRANK PAWLEY AUGER
INVENTOR

BY *Jacobs & Jacobs*
ATTORNEY

United States Patent Office 3,452,595
Patented July 1, 1969

3,452,595
FLOW RATE MEASURING DEVICE
Frank Pawley Auger, Surbiton, England, assignor to The Distillers Company Limited, Edinburgh, Scotland, a British company
Filed Jan. 24, 1967, Ser. No. 611,339
Claims priority, application Great Britain, Feb. 25, 1966, 8,348/66
Int. Cl. G01f 1/00
U.S. Cl. 73—204
7 Claims

ABSTRACT OF THE DISCLOSURE

Apparatus for measuring the rate of flow of a gas comprising a tube, which divides into branches, each branch having an arm of a flow sensitive device. Reference gas is passed through the tube and sample gas is introduced into one of the branches via a port downstream from the arm of the flow sensitive device. The effect of introducing sample gas on the relative rate of flow of reference gas over the arms of the flow sensitive device is observed.

---

The present invention relates to apparatus for the continuous measurement of the rate of flow of a stream of gas.

According to the present invention there is provided apparatus comprising a tube and a device for controlling the mass flow of gas along the tube, wherein the tube divides into two branches, an arm of a flow sensitive device, as hereinafter defined, and a flow restricting device being provided in each branch, and wherein a port is situated in one of the branches between the arm of the flow sensitive device and the flow restricting device.

In operation reference gas passes along the tube at constant mass flow and then divides so that each stream passes over an arm of the flow-sensitive device and subsequently passes through a flow restricting device, which is preferably adjustable. Simultaneously, gas whose flow rate is to be measured, hereinafter referred to as sample gas, is introduced into the one stream via the inlet port situated between the arm of the flow-sensitive device and the adjustable flow restricting device. The introduction of the sample gas into one of the streams of reference gas affects the relative rate of flow of both reference streams over the arms of the flow-sensitive device in proportion to the rate of flow of sample gas.

By a flow-sensitive device is meant any device which will respond to changes in the relative rates of flow of gas through the branches of the tube. In one embodiment the arms of the flow-sensitive device are filaments or thermistors forming part of a Wheatstone bridge. Any change in the relative rate of flow of the streams of reference gas alters the resistance of the filaments or thermistors and is shown by a change in the out-of-balance voltage of the Wheatstone bridge. Thus the change in the out-of-balance voltage provides a measure of the rate of flow of the sample gas.

It can be seen that any slight changes of pressure at the exits from the branches of the tube will momentarily affect the rate of flow of gases through the apparatus. This means that any slight changes in the atmospheric pressure will be observed as "noise." To minimize the amount of noise arising from this effect, it is preferred that the two branches of the tube should re-unite so that the streams of gas pass through one common exit.

Figure 1:
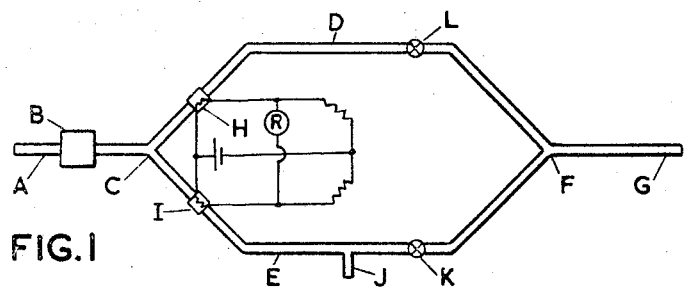
Figure 2:
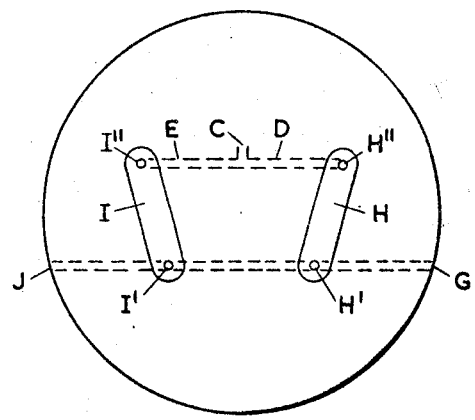
Figure 3:
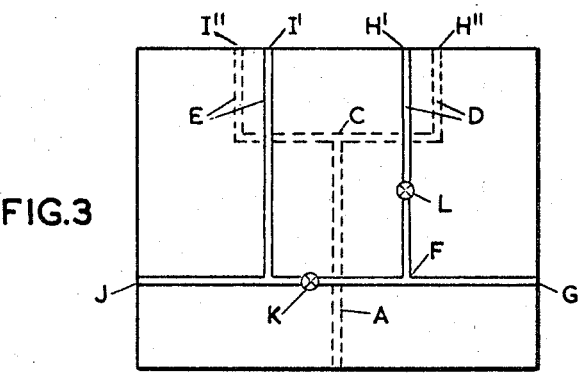

The invention will be further understood by reference to the accompanying drawing in which FIG. 1 is a flow diagram; FIG. 2 is a plan view of a specific embodiment and FIG. 3 is a sectional elevational view.

A tube A, having a mass flow controller B, divides at point C into two branches D and E which subsequently re-unite at point F to form tube G. Chambers H and I contain heated wire filaments forming two or four arms of a Wheatstone bridge as shown in FIG. 1. An inlet port J is situated between the chamber I and an adjustable flow restricting device K. A further flow restricting device L is situated on the branch D between the chamber H and the point F.

In operation, a stream of a suitable gas, for example air or nitrogen, passes through the mass flow controller B via tube A before dividing at the point C, part flowing through chamber H, the other part flowing through chamber I. The gas thus passes over the hot wire filaments contained in each chamber, and any out-of-balance voltage which arises is fed from the Wheatstone bridge to a recorder. The chambers may suitably be of the type provided in the micro-cell described in British Patent 1,024,869 or U.S. co-pending application 656,177.

The sample gas is introduced at the inlet port J, and thence passes through an adjustable flow restricting device K, for example a needle valve.

The sample gas together with the reference gas, flows past the point F where the tubes re-unite and out at G. The increase in pressure at inlet port J due to the increase in total flow through the flow restricting device K results in a decrease in the rate of flow of reference gas through the chamber I. As the total rate of flow of reference gas into the system is constant, there is a corresponding increase in the rate of flow of reference gas through chamber H. The temperature of the wires and hence the electrical resistance, depends on the rate of flow of gas through the chambers. The change in flow rate raises or lowers the temperature of the filament in H and simultaneously lowers or raises that of the filament in I and therefore creates a difference in resistance between the two wires. The change in the relative rates of flow through chamber H and I is therefore indicated as a change in the out-of-balance voltage across the Wheatstone bridge and is shown on the recorder. Thus a continuous record of the rate of flow of the gas may be obtained.

It is advisable to enclose the flow restricting device in a thermostat, so that any variation in resistance arising from expansion or contraction of valve parts is avoided.

The sensitivity of the apparatus may be varied by altering the resistance of the two branches. As the resistance of K is decreased and/or the resistance of L is increased, the sensitivity of the apparatus increases. However, as the sensitivity of the apparatus increases, the maximum flow rate which can be measured decreases. Noise caused by variations of atmospheric pressure at the exit F can be reduced by increasing the total resistance of the system, i.e. by increasing K and L. A reduction in the distance along tube A between the constant mass flow controller B and the point C will also reduce the noise level.

The apparatus illustrated in FIGS. 2 and 3 comprises a tube which divides at point C into two branches D and E. The branches D and E communicate via ports H' and H" and I' and I" with chambers H and I respectively, which are chambers of a micro-cell of the type described in British Patent 1,024,869 and each contains an arm of a Wheatstone bridge. The branches D and E are provided with needle valves L and K respectively. Situated between the chamber I and the needle valve K in branch E is an inlet port J. The two branches D and E reunite at the point F and have a common exit G.

In operation, reference gas which is controlled to maintain constant mass flow by the mass flow controller B (FIG. 1) enters the apparatus and divides at point C into two streams, one of which passes through branch D and one through branch E. The two streams pass through the chambers H and I, and the out-of-balance voltage of the Wheatstone bridge is noted. Sample gas is then introduced via port J into branch E. The increase in pressure in branch E due to the admission of sample gas reduces the rate of flow of reference gas through the branch E and hence through the chamber I of the micro-cell. As the total mass of reference gas entering the apparatus is constant, the reduction in the rate of flow of reference gas through chamber I will lead to an increase in the rate of flow through chamber H. This will cause a change in the out-of-balance voltage of the Wheatstone bridge which depends on the rate of flow of the sample gas. By observing the change in the out-of-balance voltage, a measure of the rate of flow of sample gas may therefore be obtained.

I claim:

1. Apparatus for the continuous measurement of the rate of flow of a stream of a test gas comprising a tube, the tube dividing into two branches, a flow sensitive device producing an output dependent on the flow path and capable of detecting the rate of flow of a gas, and a flow restricting device being provided in each branch, the flow sensitive devices being located between the point where the tube divides and the flow restricting devices, means for admision of a reference gas through the tube located at a point before the tube divides, the flow rate of said reference gas being known, and an inlet port for admission of the test gas in one of the branches at a point between the flow sensitive device and the flow restricting device of the same branch, whereby the rate of flow of said test gas is measured by determination of the difference in the output of the flow path of said reference gas before and after admission of said test gas.

2. Apparatus according to claim 1 wherein the flow-sensitive devices are wire filaments forming part of a Wheatstone bridge.

3. Apparatus according to claim 1 wherein the flow-sensitive devices are thermistors forming part of a Wheatstone bridge.

4. Apparatus according to claim 1 wherein the branches of the tube re-unite at a point located below the flow restriction devices.

5. Apparatus according to claim 1 wherein the flow restricting devices are adjustable.

6. Apparatus according to claim 1 wherein the means for admission of the reference gas is a constant mass flow controller situated in the tube adjacent to the point at which the tube divides.

7. A method for measuring the rate of flow of a gas which comprises passing a reference gas at constant mass flow, dividing the reference gas into two streams, each of which passes over a flow-sensitive device, introducing a sample of the test gas into one of the streams of said reference gas, downstream from the flow-sensitive device whereby the rate of flow of the stream of the reference gas is decreased as compared with the other stream of the reference gas, the decrease being in proportion to the rate of flow of the test gas and measuring the rate of flow of the test gas by determining the resultant change in the relative rate of flow of said reference gas on said flow-sensitive devices.

References Cited

UNITED STATES PATENTS

| | | | |
|---|---|---|---|
| 3,091,113 | 5/1963 | Nerheim | 73—204 X |
| 3,232,105 | 2/1966 | Fishman et al. | |
| 3,312,106 | 4/1967 | Davis | 73—203 X |
| 3,324,720 | 6/1967 | Sutherland. | |

RICHARD C. QUEISSER, *Primary Examiner.*

EDWARD D. GILHOOLY, *Assistant Examiner.*

U.S. Cl. X.R.

73—196